No. 875,867. PATENTED JAN. 7, 1908.
A. M. TEAL.
TRUCK.
APPLICATION FILED JUNE 14, 1907.

WITNESSES:

Archie M. Teal,
INVENTOR.

By C. A. Snow & Co.
ATTORNEYS

UNITED STATES PATENT OFFICE.

ARCHIE M. TEAL, OF ST. JOHN, WASHINGTON.

TRUCK.

No. 875,867.  Specification of Letters Patent.  Patented Jan. 7, 1908.

Application filed June 14, 1907. Serial No. 379,066.

*To all whom it may concern:*

Be it known that I, ARCHIE M. TEAL, a citizen of the United States, residing at St. John, in the county of Whitman and State of Washington, have invented a new and useful Truck, of which the following is a specification.

This invention relates to wheeled trucks for binders, mowing machines, hay-rakes, grain drills and other agricultural implements and has for its object to provide means for supporting the forward end of the machine thereby to over-come side draft and relieve the weight of the tongue from the neck of the draft animal.

A further object of the invention is to provide a truck frame having means for attachment to the binder or other machine and provided with a caster wheel adapted to sustain the weight of the front end of the machine and at the same time form a support for the draft tongue.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

Figure 1:
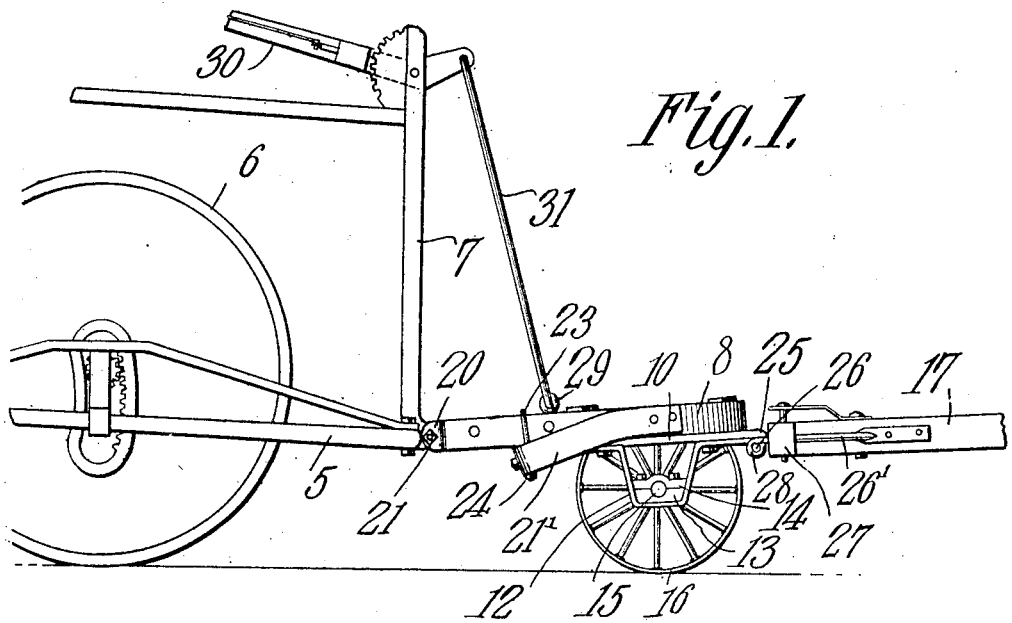
Figure 2:
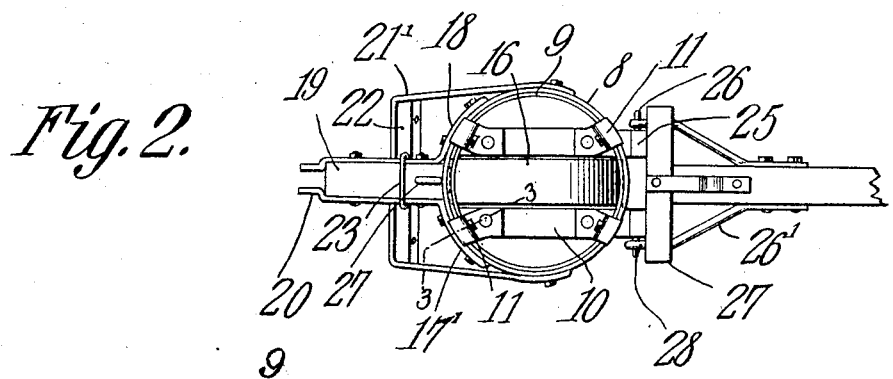
Figure 3:
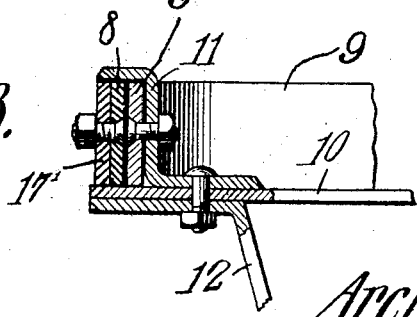

In the accompanying drawings forming a part of this specification: Figure 1 is a side elevation of a track constructed in accordance with my invention showing the same attached to a binder. Fig. 2 is a top plan view of the truck detached. Fig. 3 is an enlarged transverse sectional view taken on the line 3—3 of Fig. 2.

Similar numerals of reference indicate corresponding parts in all of the figures of the drawings.

The improved device forming the subject matter of the present invention is principally designed for attachment to binders, mowing machines and other agricultural implements for sustaining the weight of the forward end of the machine so as to prevent undue pressure on the neck of the draft animal, and by way of illustration is shown attached to a binder of the ordinary construction in which 5 designates the frame of the machine, 6 the bull wheel and 7 the standard to which is attached the operating lever for raising and lowering the forward end of the binder.

The truck consists of a circular supporting frame 8 in which is mounted for rotation an annulus 9, the latter being reinforced and strengthened by the provision of spaced transverse bars 10 the opposite ends of which are extended laterally beyond the frame 8 and bear against the bottom of the latter, as shown.

Secured to the upper surface of the transverse bars 10 are metal strips 11 having their free ends bent upwardly and thence deflected laterally over the frame 8 thereby to prevent accidental displacement of the annulus, while at the same time permitting the annulus to rotate freely within the circular supporting frame.

Depending from the transverse bars 10 are hangers 12 which form supports for suitable bearings 13 and 14 of any approved construction.

Journaled in the bearings 13 and 14 is a stub shaft 15 carrying a caster wheel 16, the latter being mounted for rotation between the transverse bars 10 and adapted to sustain the weight of the forward end of the machine and also form a support for the tongue 17.

Riveted or otherwise rigidly secured to the main frame 8 are metal straps 17' and 18 the free ends of which are extended laterally in parallel relation and are bolted or otherwise rigidly secured to a draft bar 19.

The terminals of the straps 17' and 18 are bent inwardly to form spaced parallel attaching ears adapted to engage the adjacent end of the frame of the binder, there being a bolt 21 extending laterally through the ears 20 and the adjacent end of the frame thereby to form a pivotal connection between the truck and the binder.

As a means for strengthening and supporting the draft bar 19 there is provided a rearwardly extending brace or yoke 21' preferably formed of a single piece of metal having its opposite ends riveted or otherwise rigidly secured to the main supporting frame 8.

The closed end of the yoke 21' is bent downwardly so as to extend beneath the draft bar 19 and bolted or otherwise secured to the closed end of the yoke is a bar 22 preferably formed of wood or other fibrous material. The yoke is rigidly secured to the draft bar 19 by means of a clip or staple 23, the opposite ends of which extend downwardly through the bar 22 and are threaded for engagement with suitable clamping nuts 24.

The forward ends of the transverse bars 10 are bent to form terminal eyes 25 for the reception of a coupling pin 26, said pin forming a pivotal connection between the tongue 17 and the truck frame, as shown, so as to permit vertical movement of the tongue independently of the truck frame.

The tongue 17 is preferably reinforced and strengthened by diagonal braces 26' the free ends of which are extended through the whiffle tree 27 and are provided with eyes 28 adapted to receive the coupling pin 26.

Secured to the upper surface of the draft bar 19 is a staple or eye 29 which is connected to the operating lever 30 of the binder through the medium of a link 31.

It will thus be seen that when the lever 30 is operated to lower the forward end of the binder the entire weight of the forward end of the machine will be sustained by the caster wheel 16 thus preventing injury to the neck of the draft animal.

It will also be observed that the annulus is free to rotate within the circular supporting frame while the pivotal connection between the annulus and the draft tongue permits tilting movement of the draft bar without affecting the tongue.

From the foregoing description it is thought that the construction and operation of the device will be readily understood by those skilled in the art and further description thereof is deemed unnecessary.

Having thus described the invention what is claimed is:

1. The combination with a truck frame, of a caster wheel carried by the frame, a draft tongue pivotally connected with the caster wheel, a draft bar extending laterally from one end of the frame for attachment to a vehicle, and a yoke extending beneath the draft bar and rigidly connected with said draft bar and frame.

2. The combination with a truck including a substantially circular frame, an annulus mounted for rotation on the frame and provided with transverse reinforcing bars, hangers depending from the bars, a wheel mounted for rotation in the hangers, a tongue pivotally connected with the annulus, a draft bar extending laterally from the frame for attachment to a vehicle, and a yoke extending beneath the draft bar and rigidly secured to said draft bar and frame.

3. The combination with a truck including a substantially circular frame, an annulus mounted for rotation in the frame, a wheel journaled in the annulus, a tongue pivotally connected with the annulus, a draft bar extending laterally from the frame, a yoke secured to the frame and extended beneath the draft bar, and means forming a rigid connection between the adjacent end of the yoke and the draft bar.

4. The combination with a truck including a substantially circular frame, an annulus mounted for rotation in the frame and provided with depending hangers, a wheel journaled in the hangers, a tongue pivotally connected with the annulus, a draft bar extending laterally from the frame, a yoke secured to the frame and extending beneath the draft bar, a strip of fibrous material disposed at the closed end of the yoke, and a fastening device embracing the draft bar and extending through the fibrous material for rigidly securing the yoke to the draft bar.

In testimony that I claim the foregoing as my own, I have hereto affixed my signature in the presence of two witnesses.

ARCHIE M. TEAL.

Witnesses:
   JNO. J. SCRIMSHER.
   CECIL DELL.